(12) United States Patent
Schetters

(10) Patent No.: US 8,570,778 B2
(45) Date of Patent: Oct. 29, 2013

(54) POWER CONVERTER WITH A SINGLE DIODE RECTIFIER AND A FILTER

(75) Inventor: Cornelis Johannes Adrianus Schetters, Nijmegen (NL)

(73) Assignee: NXP B.V., Eindhoven (NL)

( * ) Notice: Subject to any disclaimer, the term of this patent is extended or adjusted under 35 U.S.C. 154(b) by 1387 days.

(21) Appl. No.: 10/575,771

(22) PCT Filed: Oct. 5, 2004

(86) PCT No.: PCT/IB2004/051973
§ 371 (c)(1),
(2), (4) Date: Apr. 12, 2006

(87) PCT Pub. No.: WO2005/036725
PCT Pub. Date: Apr. 21, 2005

(65) Prior Publication Data
US 2007/0069520 A1    Mar. 29, 2007

(30) Foreign Application Priority Data
Oct. 14, 2003    (EP) .................................... 03103787

(51) Int. Cl.
*H02M 7/06*    (2006.01)
(52) U.S. Cl.
USPC ............................ 363/47; 363/126; 323/908
(58) Field of Classification Search
USPC ........... 363/47, 20, 21.12, 21.16, 126, 44, 84, 363/37, 49, 48; 323/908; 327/551
See application file for complete search history.

(56) References Cited

U.S. PATENT DOCUMENTS

| | | | | |
|---|---|---|---|---|
| 4,353,114 A | * | 10/1982 | Saleh | 363/21.18 |
| 5,285,369 A | * | 2/1994 | Balakrishnan | 363/49 |
| 6,049,471 A | * | 4/2000 | Korcharz et al. | 363/20 |
| 6,295,212 B1 | * | 9/2001 | Kayser et al. | 363/19 |
| 6,525,514 B1 | * | 2/2003 | Balakrishnan et al. | 323/277 |
| 6,813,168 B2 | * | 11/2004 | Balakrishnan | 363/44 |
| 7,068,942 B2 | * | 6/2006 | Hofmeister et al. | 398/135 |

FOREIGN PATENT DOCUMENTS

DE    4205175 A1 *    8/1993

OTHER PUBLICATIONS

TNY253/254/255 TinySwitch Family Datasheet, Power Integrations Inc., Jul. 2001, pp. 1-20.*
Michel Mardiguian, Controlling Radiated Emissions by Design, 1992, First Edition, Van Nostrand Reinhold, pp. 78-82.*
Various Authors: "Application Note, AC-DC Power Supply Design"; Dec. 1999; APEX Microtechnology Corp.; Tucson (US); pp. 1-5, App Note 35.
Various Authors: "Data Sheet Tea 152x Family"; Sep. 8, 2000; Philips Semiconductors; Eindhoven (NL).

* cited by examiner

*Primary Examiner* — Harry Behm

(57) ABSTRACT

A power converter, comprising an input circuit having a single diode rectifier (D); and a switcher mode power supply IC (SMPS).

5 Claims, 1 Drawing Sheet

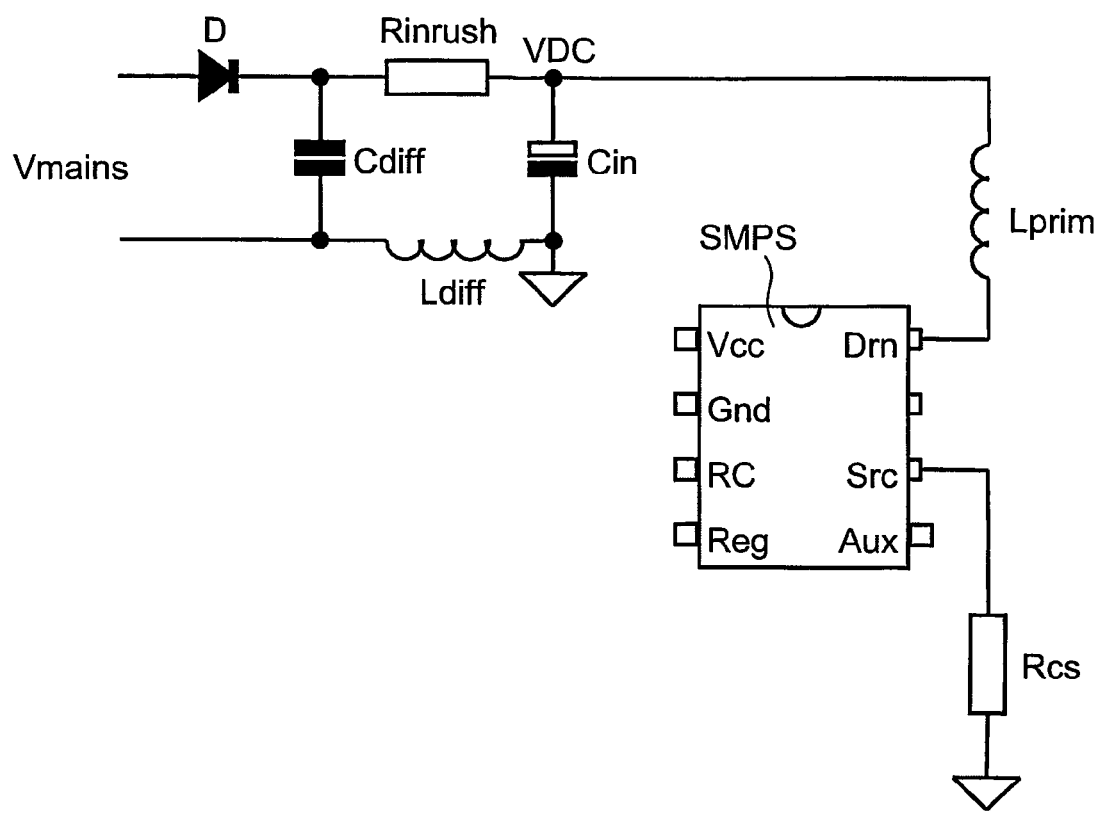

POWER CONVERTER WITH A SINGLE DIODE RECTIFIER AND A FILTER

The invention relates to a power converter.

The Philips Semiconductors datasheet for the TEA 152x family shows a Switched Mode Power Supply (SMPS) controller IC that operates directly from a rectified universal mains voltage. Its FIG. 7 shows an application diagram in which the TEA152xP IC is preceded by an input section that comprises a resistor, a full bridge rectifier, and a filter. The mains voltage is rectified, buffered and filtered in the input section and connected to the primary winding of the transformer. Philips Semiconductors has also published an application note AN00055 for this IC family, of which FIG. 12 basically shows the same application diagram. Both documents, and more particularly the mentioned figures, are incorporated by reference herein.

It is, inter alia, an object of the invention to provide a cheaper power converter without sacrificing performance. To this end, the invention provides a power converter as defined in the independent claims. Advantageous embodiments are defined in the dependent claims.

The invention is based on the recognition that in the input section before a switched mode power supply IC, a full bridge rectifier can be replaced by a single diode without sacrificing performance for major applications like battery chargers for mobile devices like GSM phones, and standby power supplies. In a preferred embodiment, the SMPS IC is the Philips Semiconductors IC TEA1520P.

These and other aspects of the invention will be apparent from and elucidated with reference to the embodiments described hereinafter.

In the drawings, FIG. 1 shows a partial circuit diagram of an embodiment of a power converter in accordance with the present invention.

In a preferred embodiment, an AC input voltage Vmains is applied to a single diode D connected in series with a non-electrolytic capacitor Cdiff of typically 100 nF. The capacitor Cdiff is part of a filter that further comprises an inrush resistor Rinrush, a coil Ldiff, and an electrolytic capacitor Cin of typically 10 μF. The DC voltage VDC at the output of the filter is applied to a series connection of a primary winding Lprim, a switched mode power supply IC SMPS, and a resistor Rcs. While the invention can be used with any commercially available SMPS IC, the SMPS IC is preferably the Philips Semiconductors IC TEA1520P, which is further connected as described in the above-mentioned datasheet and application note. As those further connections are irrelevant to understanding the main idea of this invention, viz. that when such a switched mode power supply is used, a single diode rectifier D can be used rather than a full bridge rectifier without sacrificing performance for major applications, those further connections are not described in the present description. As a further result of this inventive recognition on which the invention relies, i.e. if an SPMS IC is used, the input circuit can be simplified, in comparison with the prior art only a single electrolytic capacitor Cin of typically 10 μF is needed for smoothening the output signal of the diode D. As a result, the capacitor Cdiff can be a non-electrolytic capacitor (typically only 100 nF) that is much smaller than an electrolytic capacitor because it no longer needs to participate in smoothening the output signal of the diode D. The combination of the coil Ldiff and the non-electrolytic capacitor Cdiff only serves to filter distortions caused by the SMPS IC so that the mains network is not polluted. For this SMPS-caused distortions filtering function a non-electrolytic capacitor Cdiff is even preferred as such a nonelectrolytic capacitor has a much smaller series resistance than an electrolytic capacitor, so that a better SMPS-caused distortions filter is obtained.

The Philips IC TEA1520P is preferred as it has a high gain feedback loop having a multiplier by a factor 10 as described in Section 3.4 of the above-mentioned application note. This multiplier serves to diminish any 100 Hz ripple caused by using a small mains capacitor.

This Philips IC is also preferred as it has an internal start-up circuit comprising an accurate high-voltage start-up current source instead of a dissipative bleeder resistor, as described in Section 3.4 of the above-mentioned application note. As a result of using a current source, the start-up time is less dependent on the input voltage, which is preferable if a less stable input voltage is applied to the IC.

A preferred embodiment can be summarized as follows. The component count of the input section can be reduced in a power converter having an integrated fly-back controller that is able to withstand large voltage variations on the input, preferably Philips Semiconductor' STARplug Family. FIG. 1 shows a typical example, while those skilled in the art will notice that Rinrush and Cdiff can be connected in different ways. In this example, the STARplug IC omits the need for a stabilized DC voltage and therefore reduces the input section component count (reduction of three mains diodes and replacement of one mains electrolytic capacitor by a standard capacitor). All this leads to price and PCB area reduction.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A power converter, comprising:
an input circuit having a rectifier configured for receiving a full-wave AC signal along a first conductive path and a second conductive path, the rectifier including a single diode rectifier and a filter that includes an inrush resistor, a coil, an electrolytic capacitor, and a non-electrolytic capacitor connected in series with the rectifier, the coil connected in series with the non-electrolytic capacitor and arranged to extend the second conductive path to common, and the filter providing a DC voltage output at a circuit node connecting the inrush resistor and one electrode of the electrolytic capacitor, and wherein the coil and the inrush resistor are connected in parallel between the non-electrolytic capacitor and the electrolytic capacitor, and a switched mode power supply IC arranged to receive the DC voltage output from the filter.

2. A power converter, comprising:
an input circuit having a rectifier configured for receiving a full-wave AC signal along a first conductive path and a second conductive path, the rectifier including a single diode rectifier and a filter providing a DC voltage output, the filter including a non-electrolytic capacitor connected in series with the rectifier, a electrolytic capacitor, an inrush resistor, and a coil arranged in parallel with the inrush resistor between the electrolytic capacitor and the non-electrolytic capacitor and arranged to extend the second conductive path to common; and a switched mode power supply IC arranged to receive the DC voltage output from the filter.

3. A power converter as claimed in claim 2, wherein the electrolytic capacitor has a capacitance of about 10 μF.

4. A power converter as claimed in claim 1, wherein the single diode rectifier has one terminal connected to the non-electrolytic capacitor and to the inrush resistor.

5. A power converter as claimed in claim 1, wherein the single diode rectifier has one terminal connected to one end of the non-electrolytic capacitor and to one end of the inrush resistor, wherein the other end of the non-electrolytic capacitor is connected to one end of the coil, wherein the other end of the inrush resistor is connected to one electrode of the electrolytic capacitor, wherein the other electrode of the electrolytic capacitor is connected to the other end of the coil and common, and wherein the switched mode power supply IC is arranged to provide a DC power signal relative to common.

* * * * *